United States Patent [19]

Lukas

[11] 3,995,149

[45] Nov. 30, 1976

[54] COMPACT MULTIFLASH UNIT WITH IMPROVED COVER-LOCKING MEANS AND PRISMATIC LIGHT-CONTROLLING MEANS

[75] Inventor: Josef Lukas, Augsburg, Germany

[73] Assignee: Patent-Treuhand-Gesellschaft fur Elektrische Gluhlampen mbH, Munich, Germany

[22] Filed: Mar. 21, 1975

[21] Appl. No.: 560,465

[30] Foreign Application Priority Data

Apr. 4, 1974   Germany...................... 7411808[U]

[52] U.S. Cl............................ 240/1.3; 240/46.45; 240/46.59
[51] Int. Cl.²........................................ G03B 15/02
[58] Field of Search.............. 240/1.3, 103 R, 46.33, 240/46.45, 46.59; 354/126, 127; 431/93, 95

[56] References Cited
UNITED STATES PATENTS

| | | | |
|---|---|---|---|
| 3,167,256 | 1/1965 | Elliott................... | 240/1.3 |
| 3,172,345 | 3/1965 | Jakob et al. ........... | 354/126 |
| 3,488,486 | 1/1970 | Bretthauer............. | 240/1.3 |
| 3,508,040 | 4/1970 | Bertrams et al. ...... | 240/1.3 |
| 3,517,182 | 6/1970 | Brooks et al........... | 240/1.3 |
| 3,518,417 | 6/1970 | Bertrams............... | 240/1.3 |
| 3,725,692 | 4/1973 | Miller et al. .......... | 240/1.3 |
| 3,860,809 | 1/1975 | Shoupp et al.......... | 240/1.3 |
| 3,878,385 | 4/1975 | Kingston............... | 240/1.3 |

FOREIGN PATENTS OR APPLICATIONS

V6,678   5/1956   Germany.............. 240/1.3

*Primary Examiner*—Fred L. Braun
*Attorney, Agent, or Firm*—D. S. Buleza

[57] ABSTRACT

The protective plastic cover component of a compact multiflash unit that has integrally-formed prisms on its side walls is fastened to the base component by overlying adhesive strips of clear plastic material. The cover and base components are thus securely locked in operative relationship with one another without the application of heat or ultrasonic energy which could distort the prismatic light-focusing side walls of the cover and alter their optical characteristics. In mechanically-ignitable type flash units the potential danger of accidentally firing the flashlamps by heating or vibrating the percussive ignition material on the anvils during the joining operation is also avoided.

5 Claims, 1 Drawing Figure

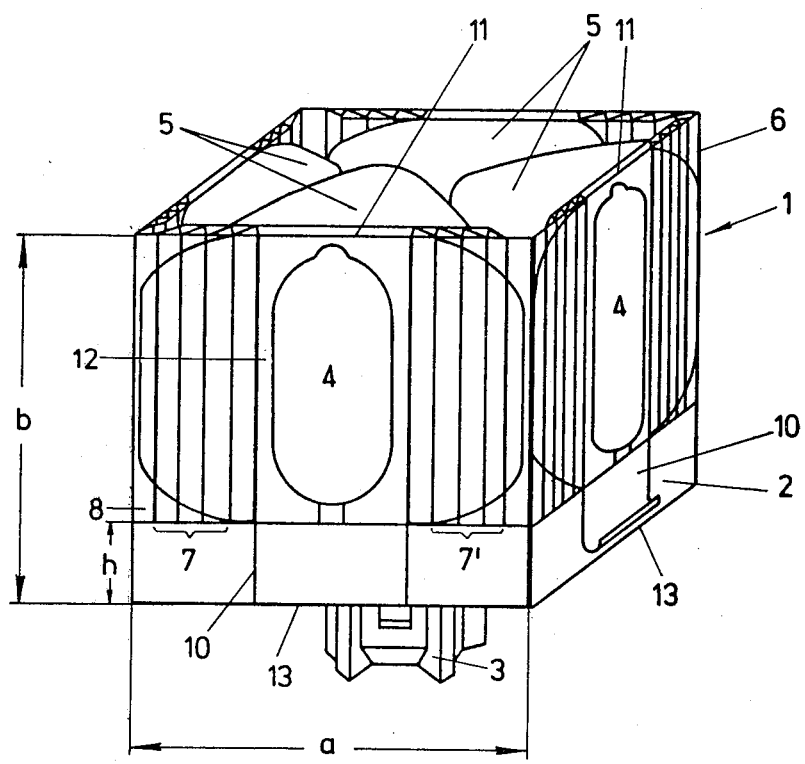

COMPACT MULTIFLASH UNIT WITH IMPROVED COVER-LOCKING MEANS AND PRISMATIC LIGHT-CONTROLLING MEANS

CROSS-REFERENCES TO RELATED APPLICATIONS

The present application is related to but constitutes an improvement over the subject matter of the concurrently-filed application of Alfred Wacker, Ser. No. 560,463 assigned to the same assignee as this application.

This application discloses and claims the same invention as that set forth in German Utility Model Application G7411808.4 filed Apr. 4, 1974.

BACKGROUND OF THE INVENTION

1. Field of the Invention

This invention relates to photographic lighting apparatus and has particular reference to an improved multiflash unit of compact size that contains a plurality of flashlamps.

2. Description of the Prior Art

Disposable multiflash units which contain a plurality of flashlamps that are mounted on a carrier or base member that has an integrally-formed jack holder or post adapted to permit the unit to be inserted into the socket of a camera or into an adapter that is coupled to a camera, are well known in the art. In the so-called "Magicube" flash units presently being marketed, four mechanically ignitable flashlamps are mounted on a plastic base member in operative relationship with a corresponding number of springs for igniting the lamps and a reflector component that defines individual reflector elements for each lamp. The base member is of generally square configuration and a cover of transparent plastic and cubical configuration is fastened to the base member and protectively closes the lamps, igniter springs and reflector component.

The aforementioned Magicube flash units of the prior art have a width dimension (the basal edge length along one side) of approximately 30 mm. and an overall height (length along its lateral edge which thus includes the thickness of the base member plus the lateral edge length or height of the protective cover) of approximately 34 mm. The width-to-height ratio of the prior art units is thus less than 1.

The reflector component employed in such prior art multiflash units has a height of about 30 mm. and a width (length along one basal or side edge) of about 25 mm. The distance between the apex of the individual reflector elements and the adjacent inner face of the side wall of the protective cover is about 12 mm. in each case. The outer bulb diameter of the flashlamps is about 9 mm., the overall lamp length (bulb length plus the protruding portion of the igniter tube) is about 30 mm., and the bulb volume is about 0.6 cc. The flashlamps are filled with zirconium shreds and gaseous oxygen and the faces of the side walls of the protective cubical cover are flat and smooth. The protective cover is ultrasonically welded to the plastic base member, or the two components can be joined by hot welding or gluing techniques.

Hot welding and gluing techniques provide advantages in that they avoid vibrating the igniter tube assemblies of the percussive flashlamps which inherently occurs during the ultrasonic welding operation and could accidentally ignite the lamps.

Juncture of the plastic cover and base components by hot welding can be achieved by pressing a heated wedge-shaped tool of V or N — profile against the flash unit in the junction area where the cover and base overlap one another. The localized heating of the plastic produced by the hot tool forms a depression in the plastic at the junction area which has the same shape as the profile of the tool and forms a fusion weld, when the plastic cools, which securely locks the cover and base members together. A multiflash unit having plastic cover and base components that have been heat-welded together in this fashion is disclosed and claimed in U.S. Pat. No. 3,860,810, issued Jan. 14, 1975 to Josef Lukas et al.

Multiflash units of the mechanically-actuable type which are more compact or are "miniaturized" have been proposed and designed. The reduction in size is obtained by decreasing the size of the flashlamps and by making corresponding reductions in the size of the reflector component and plastic base and protective cover components. Specially designed springs for igniting the flashlamps are also employed. The width dimension (basal edge length) of such compact units is only about 24 mm. and their overall height (lateral edge length) is only about 22 mm. Thus, the width-to-height ratio of such compact multiflash units is equal to or only slightly greater than 1. The reflector component employed in such compact units has a height of only about 17 mm. and a width dimension (basal edge length) of only about 22 mm. The spacing between the apex of the individual reflector elements and the inner face of the associated side wall of the protective cover is only about 9 mm. The outer bulb diameter of the flashlamps is about 7 mm., the overall length of the lamps (bulb length plus the protruding portion of the igniter tube) is about 20 mm., and the bulb volume is about 0.2 cc.

Due to the reduction in the height (lateral edge dimension) of the aforementioned compact multiflash units and the corresponding reduction in the height of the reflector component, the shortened individual reflector elements effected an excessive lateral spreading of the light produced by the flashlamps, thereby decreasing the amount of light projected onto the scene being photographed. In order to obtain the desired intensity and distribution of the radiation in the direction in which the picture is being taken, the inner faces of the side walls of the protective plastic cover employed in such compact multiflash units are provided with integrally formed prismatic elements that produce a light-focusing effect. A compact multiflash unit having such integral light-focusing prismatic means is disclosed and claimed in the aforementioned concurrently-filed application Ser. No. 560,463 of Alfred Wacker.

The manufacture of such compact or miniaturized multiflash unit presents a problem in that the percussive flashlamps and their igniter tubes are located much closer to the peripheral rim and junction areas along which the plastic cover and base components are fastened together. Ultrasonically welding the cover and base together is thus impractical since this would vibrate the anvils and accidentally ingite the lamp. When the juncture is formed by hot welding or with a suitable adhesive, the intense heat also might easily accidentally cause the flashlamps to ignite, thus ruining the unit. In addition, such hot welding and gluing techniques inherently distort the integrally-formed inner-prismatic profiling of the side walls of the protective plastic cover and thus impair the quality of the finished multiflash units.

SUMMARY OF THE INVENTION

In accordance with the present invention, the aforementioned problems are avoided by locking the plastic cover component to the plastic base member with a series of adhesive strips of transparent plastic that overlie and are bonded to selected adjacent portions of these two components. The juncture of the cover and base components is thus achieved without any localized heating, ultrasonic vibrating, or deformation of the plastic components and the dangers of accidentally igniting the flashlamps and/or distorting and ruining the integrally-formed light-controlling prisms on the inner wall surface of the plastic cover are completely avoided.

BRIEF DESCRIPTION OF THE DRAWING

A better understanding of the invention will be obtained from the exemplary embodiment illustrated in the sole FIGURE of the accompanying drawing which comprises a pictorial view of a compact multiflash unit assembled in accordance with the invention.

DESCRIPTION OF THE PREFERRED EMBODIMENT

As shown in the drawing, the compact multiflash unit 1 according to the present invention comprises a square-shaped plastic base member 2 that serves as a carrier and has an integrally-formed post or jack holder 3 which is adapted to be inserted into the camera socket. Four mechanically-ignitable flashlamps 4 (only two of which are shown) that have the usual igniter tubes (not shown) sealed into the lamp bulbs are mounted on the base member 2 in the usual manner. The igniter tubes each contain an anvil that is coated with a suitable percussive primer. The overall length of the flashlamps 4 (including the portion of the igniter tube that protrudes from the lamp bulb) is about 20 mm., the outer bulb diameter is about 7 mm. and the bulb volume is about 0.2 cc. The flashlamps are filled with shredded zirconium and gaseous oxygen. However, either hafnium or yttrium may also be used as the combustible material.

Shattering of the fired flashlamps 4 is prevented in the customary manner by coating them with a suitable layer of colorless plastic such as a cellulose lacquer. Ignition of the lamps 4 is achieved by flat spiral springs (not shown) that are mounted on the base member 2 in operative relationship with each of the lamps in accordance with standard practice. A reflector component that defines four individual reflector elements 5 is also mounted on the base member 2 in operative relationship with the flashlamps 4. The reflector component has a height of 17 mm. and a width (basal edge length) of 22 mm. The aforesaid components are enclosed within a radiation-transmissive protective cover 6 of cubical configuration which is composed of blue-colored plastic material.

In accordance with the teachings of the aforementioned concurrently-filed Wacker application, Ser. No. 560,463, the inner face of each of the side walls 8 of the protective plastic cover 6 are provided with integrally-formed spaced-apart sets 7 and 7' of prisms which cooperate with the individual reflector elements 5 in guiding the light emission of the flashlamps in the direction in which the picture is being taken by providing a focusing effect. The width dimension $a$ (basal edge length) of the compact multiflash until 1 is 24 mm. and its height dimension $b$ (lateral edge length) is 22 mm.

The base member 2 and protective cover 6 are locked together in interfitting assembled relationship in accordance with the invention by four strips 10 of adhesive radiation-transmissive plastic that overlie and are bonded to adjacent portions of these two components and are disposed on the side faces of the unit. As illustrated, the strips 10 of adhesive plastic extend from the upper edges 11 of the protective plastic cover 6, across the flat non-profiled central portions 12 of the respective side walls 8 of the cover, and down to the bottom edges 13 of the base member 2. The rim or peripheral edge of the base member 2 has a height $h$ of 5 mm. and thus provides a sufficient area for securely anchoring the overlying end segments of the adhesive plastic strips 10. The ratio of the height of the peripheral rim of the base member 2 to the height dimension $b$ of the multiflash unit 1 is thus 5:22 and is greater than 1:4.

The adhesive plastic strips 10 must be kept off of the bottom face of the base member 2 because the latter must be kept clear of any bulges or the like that could interfere with the rotation of the multiflash unit 1 when it is mounted on the camera. The width of the adhesive plastic strips 10 is about 8 mm., their thickness is about 0.05 mm. and the strips are composed of colorless plastic material. The ratio of the width of the plastic strips 10 to the width (dimension $a$) of the multiflash unit 1 is thus 8:24 or 1:3.

In order to obtain a continuous transition from the adhesive plastic strips 10 to the outer faces of the multiflash unit 1, selected portions of the outer surfaces of the plastic cover 6 and base member 2 may be provided with shallow depressions to form a continuous groove in the region of the adhesive strips 10 which matches the length, width and depth of the strips.

Of course, the protective plastic cover may be fabricated from colorless plastic and the multiflash unit 1 can be provided with blue-colored flashlamps. Adhesive strips of radiation-transmissive plastic can also be employed to securely join the plastic cover and base components of "flashcubes" that contain electrically-ignitable flashlamps instead of mechanically-ignitable lamps. Such juncture strips can also be used in other types of multiflash units of spherical configuration, etc., that are equipped with either electrically or mechanically-ignitable flashlamps.

What is claimed is:

1. In a compact photographic multiflash unit that includes a plurality of flashlamps that are mounted on a base member in operative relationship with a reflector component which defines individual reflector elements for each of said flashlamps, the improvement comprising a protective cover component of radiation-transmissive material that has integrally-formed light-controlling prisms on its side walls and is locked in operative relationship with the base member solely by a plurality of strips of adhesive radiation-transmissive plastic that overlie and are attached to adjoining portions of said cover component and base member, said light-controlling prisms being arranged in spaced-apart sets that are so located that the mid-portions of each of the side walls of the cover component are flat and devoid of prisms, said plastic strips being narrower than the associated side walls of the cover component and extending from the upper portions of the respective side walls across the flat non-prismatic midportions thereof.

2. The compact multiflash unit of claim 1 wherein said plastic strips are located in and extend along depressed portions in the outer surfaces of the cover and base components which define shallow grooves whose length, width and depth match the corresponding dimensions of the associated plastic strips.

3. The compact multiflash unit of claim 1 wherein; said base member has a peripheral rim with an outer surface having a height dimension such that the ratio thereof relative to the height dimension of the multiflash unit is greater than 1:4, and said strips of adhesive plastic extend across the associated outer surfaces of the peripheral rim of said base member and terminate at the bottom edges of the base member.

4. The compact multiflash unit of claim 3 wherein; said base member is composed of plastic and is of generally square configuration, said cover component is also composed of plastic and is of generally cubical configuration, and one of said plastic strips is located on each of the four side faces of the multiflash unit defined by the outer surfaces of said cover component and base member.

5. The compact multiflash unit of claim 4 wherein; said light-controlling prisms are located on the inner surfaces of the respective side walls of the plastic cover component, and the ratio of the width dimension of said plastic strips to the width dimension of the multiflash unit is approximately 1:3.

* * * * *